United States Patent
Chang et al.

(10) Patent No.: US 8,706,044 B2
(45) Date of Patent: Apr. 22, 2014

(54) METHODS OF TESTING WIRELESS DEVICES IN OVER-THE-AIR RADIO-FREQUENCY TEST SYSTEMS WITHOUT PATH LOSS CHARACTERIZATION

(75) Inventors: Thomas W. Chang, Sunnyvale, CA (US); Adil Syed, Santa Clara, CA (US); David A. Donovan, Oakland, CA (US)

(73) Assignee: Apple Inc., Cupertino, CA (US)

( * ) Notice: Subject to any disclaimer, the term of this patent is extended or adjusted under 35 U.S.C. 154(b) by 753 days.

(21) Appl. No.: 12/872,963

(22) Filed: Aug. 31, 2010

(65) Prior Publication Data

US 2012/0052816 A1 Mar. 1, 2012

(51) Int. Cl.
*H04B 17/00* (2006.01)

(52) U.S. Cl.
USPC ...................................... 455/67.11

(58) Field of Classification Search
USPC .................. 455/67.11, 67.12, 67.14
See application file for complete search history.

(56) References Cited

U.S. PATENT DOCUMENTS

| | | | |
|---|---|---|---|
| 7,623,829 B2* | 11/2009 | Wells et al. ................. | 455/67.11 |
| 7,773,964 B2 | 8/2010 | Ozaki et al. | |
| 2002/0082792 A1* | 6/2002 | Bourde et al. ................. | 702/107 |
| 2002/0160717 A1* | 10/2002 | Persson et al. ................. | 455/67.1 |
| 2003/0206021 A1* | 11/2003 | Laletin et al. ................. | 324/426 |
| 2004/0116111 A1* | 6/2004 | Saunders ..................... | 455/423 |
| 2005/0046430 A1* | 3/2005 | Kinnunen et al. ............ | 324/750 |
| 2007/0041437 A1* | 2/2007 | Kuo et al. .................... | 375/227 |
| 2007/0207758 A1* | 9/2007 | Qi et al. ...................... | 455/226.2 |
| 2010/0203880 A1 | 8/2010 | Sotoudeh | |

FOREIGN PATENT DOCUMENTS

| | | |
|---|---|---|
| EP | 1830494 A1 | 5/2007 |
| EP | 2131510 A1 | 9/2009 |

OTHER PUBLICATIONS

Mow et al., U.S. Appl. No. 12/577,128, filed Oct. 9, 2009.
Gregg et al., U.S. Appl. No. 61/351,821, filed Jun. 4, 2010.
Gregg et al., U.S. Appl. No. 61/351,792, filed Jun. 4, 2010.
Mow et al., U.S. Appl. No. 61/329,455, filed Apr. 29, 2010.

* cited by examiner

*Primary Examiner* — Yuwen Pan
*Assistant Examiner* — Ayodeji Ayotunde
(74) *Attorney, Agent, or Firm* — Treyz Law Group; Jason Tsai

(57) ABSTRACT

A method for testing wireless devices under test (DUTs) in a wireless test station is provided. Each test station may include a test unit, a test chamber with an antenna, and a radio-frequency (RF) cable that connects the test unit to the test chamber. Reference DUTs may be used to calibrate each test station to compute a corrected linear equation based on a nominal path loss value. Over-the-air (OTA) path loss of each test station may not be directly measured. Once calibrated, the test chambers may be used during product testing to test factory DUTs to determine whether a particular factory DUT satisfies pass/fail criteria. During product testing, measured output power levels may be compared with expected output power levels computed using the corrected linear equation. The amount of error between the measured and expected output power levels will determine whether a production DUT satisfies the pass/fail criteria.

19 Claims, 6 Drawing Sheets

METHODS OF TESTING WIRELESS DEVICES IN OVER-THE-AIR RADIO-FREQUENCY TEST SYSTEMS WITHOUT PATH LOSS CHARACTERIZATION

BACKGROUND

This relates generally to testing wireless electronic devices, and more particularly, to testing wireless electronic devices in over-the-air (OTA) radio-frequency test systems.

Wireless electronic devices typically include transceiver circuitry, antenna circuitry, and other radio-frequency circuitry that provides wireless communications capabilities. During testing, wireless electronic devices under test (DUTs) can exhibit different performance levels. For example, each wireless DUT in a group of DUTs can exhibit its own output power level, gain, frequency response, efficiency, linearity, dynamic range, etc.

The performance of a wireless DUT can be measured using an OTA test station. An OTA test station includes a test chamber with a test chamber antenna, a test unit, and a test host. The test chamber antenna is connected to the test unit and is used in sending and receiving radio-frequency (RF) signals to and from the test unit. The test host is connected to the test unit and directs the test unit to perform desired operations during testing.

During test operations, a wireless DUT is placed into the test chamber and communicates wirelessly with the test chamber antenna in the test chamber. Wireless transmissions of this type experience OTA path loss between the DUT antenna and the test chamber antenna.

An OTA test system typically includes multiple OTA test stations that are used to test multiple wireless DUTs in parallel. Each OTA test station typically includes its own test chamber, test unit, and test host. A production (factory) DUT is placed into the test chamber of each test station during product testing. Typical product testing involves measuring the wireless performance of each DUT and applying pass/fail criteria.

The radio-frequency path loss of each test station has its own unique OTA path loss characteristic. In an effort to provide accurate test measurement results across different test stations, conventional test methods involve calibrating the different test stations with golden DUTs (i.e., DUTs that may exhibit known performance) to characterize the OTA path loss of each test station. OTA path loss may vary depending on the output power level of the wireless DUTs, operating frequency, test chamber configuration, test chamber antenna location, etc. As a result, OTA path loss characterization using golden DUTs to provide accurate measurements across different test conditions is an arduous and time-intensive calibration process.

It would therefore be desirable to be able to provide improved ways of testing wireless DUTs in a wireless test system.

SUMMARY

Test stations in an over-the-air (OTA) radio-frequency test system can be calibrated prior to product testing using golden reference devices under test (DUTs). Each test station may include a test chamber, a test chamber antenna in the test chamber, a test unit, a radio-frequency (RF) cable that connects the test chamber antenna to the test unit, and a test host.

During calibration operations, a golden reference DUT may be placed in the test chamber. During a first time period, the test host may direct the golden reference DUT to produce RF signals at a first requested output power level. The test unit may be used to measure a first measured output power level of the RF signals produced by the golden reference DUT during the first time period to obtain a first data point.

During a second time period, the test host may direct the golden reference DUT to produce RF signals at a second requested output power level. The test unit may be used to measure a second measured output power level of the RF signals produced by the golden reference DUT during the second time period to obtain a second data point.

The first and second measured output power levels may be adjusted (offset) by a nominal OTA path loss value to obtain first and second adjusted data points. The nominal path loss value is an assumed value (e.g., the path loss of the test chamber has not been directly characterized). For example, the nominal OTA path loss value may be equal to −40 dB or other suitable path loss values.

A corrected linear equation may be computed based on the first and second adjusted data points. The slope of a given line that passes through the first and second adjusted data points may be computed. A corrected slope of the corrected linear equation may be equal to the reciprocal of the slope of the given line.

The given line may be compared to an ideal characteristic line. The ideal characteristic line may show that ideal output power levels are directly proportional to requested output power levels and may have a slope of one. An offset between the given line and the ideal characteristic line may be computed by calculating the vertical distance between the given line and the ideal characteristic line at a selected requested output power level (e.g., a requested output power level that is equal to the average of the first and second requested output power levels). A corrected offset (e.g., the y-intercept) of the corrected linear equation may be equal to the negative version of the calculated offset.

During product testing, a factory DUT may be placed in the test chamber. The test host may direct the factory DUT to produce RF signals at a desired requested output power level. The test unit may be used to measure a corresponding measured output power level. An expected output power level may be computed using the corrected linear equation (e.g., using the desired requested output power level as an input to the corrected linear equation). An error between the measured output power level and the expected output power level may be computed. If the error is less than a predetermined threshold value, the factory DUT satisfies pass/fail criteria. If the error is greater than the predetermined threshold value, the factory DUT does not satisfy the pass/fail criteria.

Further features of the present invention, its nature and various advantages will be more apparent from the accompanying drawings and the following detailed description.

DETAILED DESCRIPTION

Wireless electronic devices include antenna and transceiver circuitry that supports wireless communications. Examples of wireless electronic devices include desktop computers, computer monitors, computer monitors containing embedded computers, wireless computer cards, wireless adapters, televisions, set-top boxes, gaming consoles, routers, or other electronic equipment. Examples of portable wireless electronic devices include laptop computers, tablet computers, handheld computers, cellular telephones, media players, and small devices such as wrist-watch devices, pendant devices, headphone and earpiece devices, and other miniature devices.

Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also handle the 2100 MHz band.

Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz. It is sometimes desirable to receive satellite navigation system signals such as signals from the Global Positioning System (GPS). Electronic devices may therefore be provided with circuitry for receiving satellite navigation signals such as GPS signals at 1575 MHz.

Figure 1:
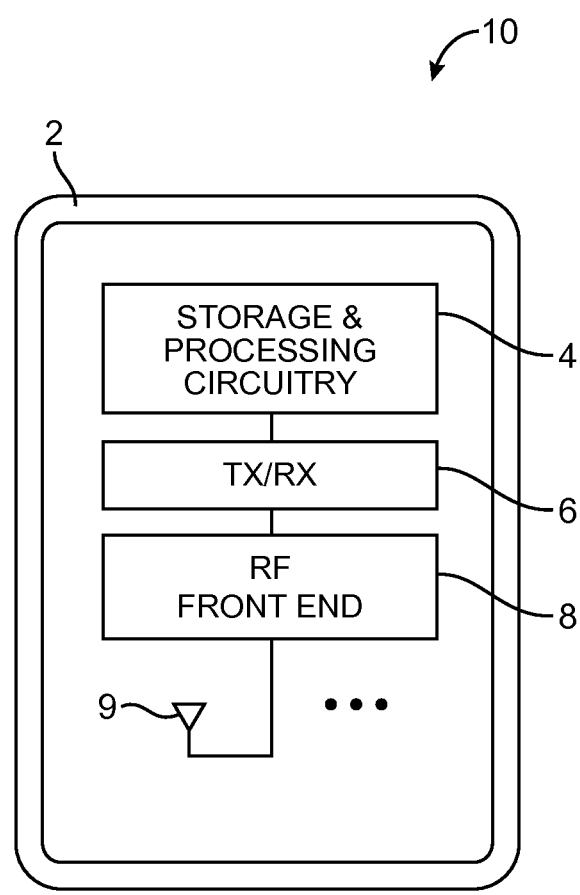
FIG. 1 is a diagram of an illustrative wireless device under test with radio-frequency circuitry in accordance with an embodiment of the present invention.

In testing environments, the wireless electronic devices are sometimes referred to as devices under test (DUTs). FIG. 1 shows an example of a test device such as DUT 10. DUT 10 may be a portable electronic device, a computer, a multimedia device, or other electronic equipment. DUT 10 may have a device housing such as housing 2 that forms a case for its associated components.

DUT 10 may have storage and processing circuitry such as storage and processing circuitry 4. Storage and processing circuitry 4 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 4 may be used to control the operation of device 10. This processing circuitry may be based on one or more microprocessors, microcontrollers, digital signal processors, application specific integrated circuits, etc.

Circuitry 4 may interact with a transceiver circuit such as transceiver circuit 6. Transceiver circuit 6 may include an analog-to-digital converter (ADC), a digital-to-analog converter (DAC), a digital down-converter (DDC), and a digital up-converter (DUC).

In a scenario in which DUT 10 is transmitting, circuitry 4 may provide digital data (e.g., baseband signals) to the DUC. The DUC may convert or modulate the baseband digital signals to an intermediate frequency (IF). The IF digital signals may be fed to the DAC to convert the IF digital signals to IF analog signals. The IF analog signals may then be fed to an RF front end such as RF front end 8.

When DUT 10 is receiving wireless signals, RF front end 8 may provide incoming IF analog signals to the ADC. The ADC may convert the incoming IF analog signals to incoming IF digital signals. The incoming IF digital signals may then be fed to the DDC. The DDC may convert the incoming IF digital signals to incoming baseband digital signals. The incoming baseband digital signals may then be provided to circuitry 4 for further processing. Transceiver circuit 6 may either up-convert baseband signals to IF signals or down-convert IF signals to baseband signals. Transceiver block 6 may therefore sometimes be referred to as an IF stage.

RF front end 8 may include circuitry that couples transceiver block 6 to one or more antenna such as antenna 9. RF front end 8 may include circuitry such as matching circuits, band-pass filters, mixers, low noise amplifier circuitry, power amplifier circuitry, etc. Circuitry 4, transceiver block 6, RF front end 8, and antenna 9 may be housed within housing 2.

In the scenario in which DUT 10 is transmitting, RF front end 8 may up-convert the IF analog signals from transceiver block 6 to RF analog signals (e.g., the RF signals typically have higher frequencies than the IF signals). The RF analog signals may be fed to antenna 9 for broadcast. If desired, more than one antenna may be used in DUT 10.

In the scenario in which DUT 10 is receiving wireless signals, antenna 9 may receive incoming RF analog signals from a broadcasting device such as a base transceiver station, network access point, etc. The incoming RF analog signals may be fed to RF front end 8. RF front end 8 may down-convert the incoming RF analog signals to IF analog signals. The IF analog signals may then be fed to transceiver circuit 6 for further data processing.

Figure 2:
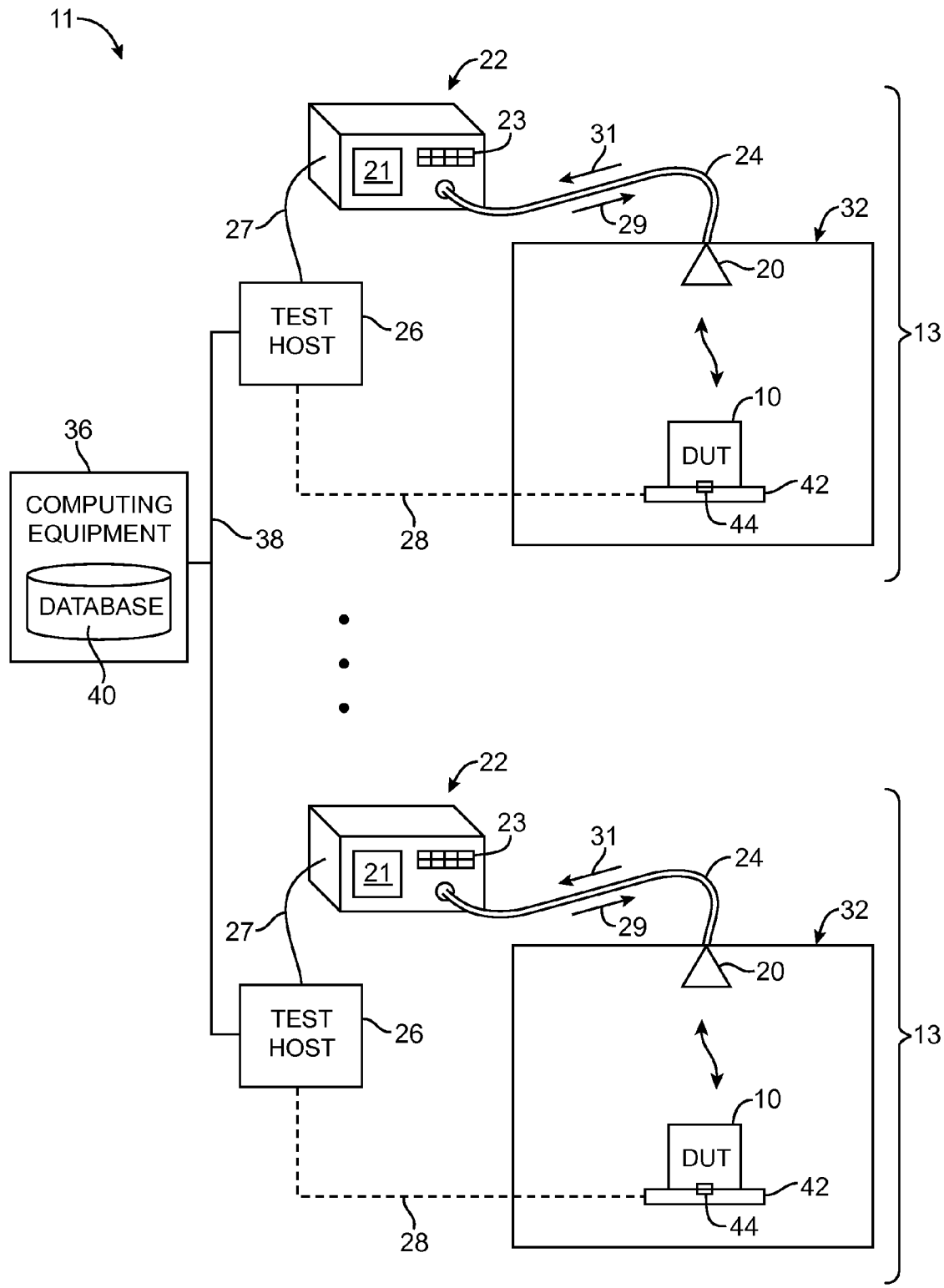
FIG. 2 is a diagram of illustrative test stations each connected to computing equipment and each including a test chamber, a test unit, and a test host in accordance with an embodiment of the present invention.

During product testing, many wireless devices (e.g., hundreds, thousands, or more of DUTs 10) may be tested in a test system such as test system 11 of FIG. 2. Test system 11 may include test accessories, computers, network equipment, tester control boxes, cabling, test chambers with antennas, and other test equipment for transmitting and receiving radio-frequency test signals and gathering test results. Test system 11 may include multiple test stations such as test stations 13. There may, for example, be 80 test stations 13 at a given test site. Test system 11 may include any desired number of test stations to achieve desired test throughput.

Each test station 13 may include a test chamber such as test chamber 32, a test unit such as test unit 22, a radio-frequency (RF) cable 24 that connects chamber 32 to test unit 22, and a test host such as test host 26 (e.g., a personal computer). Test chambers 32 may be used during product testing to measure the performance of production (factory) DUTs 10.

Each test chamber 32 may have a cubic structure (six planar walls), a rectangular prism-like structure (six rectangular walls), a pyramid structure (four triangular walls with a rectangular base), or other suitable structures.

Test chambers 32 may each have a test chamber antenna such as test chamber antenna 20 mounted inside the chamber. Antenna 20 (sometimes referred to as an OTA antenna) may, for example, be a patch antenna, a horn antenna, or other types of antennas. During product testing, DUT 10 may be placed inside test chamber 32 to test for the performance (e.g., the output power level, etc.) of DUT 10 while antenna 20 communicates wirelessly with antenna(s) 9 of DUT 10.

Test unit (tester) 22 in each test station 13 may be a radio communications tester of the type that is sometimes referred to as a test box or a radio communications tester. Test unit 22 may be used to perform radio-frequency signaling tests for a variety of different radio-frequency communications bands and channels.

Test unit 22 may be operated directly or via computer control (e.g., when test unit 22 receives commands from test host 26). When operated directly, a user may control test unit 22 by supplying commands directly to the test unit using the user input interface of the test unit. For example, a user may press buttons in a control panel 23 on the test unit while viewing information that is displayed on a display 21 in the test unit. In computer controlled configurations, a test host such as computer 26 (e.g., software running autonomously or semi-autonomously on the computer) may communicate with the test unit (e.g., by sending and receiving data over a wired path 27 or a wireless path between the computer and the test unit).

Test host 26 may be coupled to DUT 10 through wired path 28 or a wireless path between test host 26 and DUT 10. Connected in this way, test host 26 may send commands over path 28 to configure DUT 10 to perform desired operations during product testing.

In one suitable arrangement, test host 26 may be connected to a test fixture such as test fixture 42 through path 28 (see, e.g., FIG. 2). Fixture 42 may have an RF connector such as RF connector 44 mounted on its surface. DUT 10 may have a corresponding RF connector that is used to mate with RF connector 44 during testing. In the mated state, data may be conveyed between test host 26 and DUT 10 over path 28.

Test unit 22 may be connected to test chamber antenna 20 of test chamber 32 through RF cable 24. Test station 13 with test unit 22 connected to antenna 20 of test chamber 32 using RF cable 24 in this way may be used to perform OTA testing of wireless electronic devices. For example, a DUT 10 may be placed within test chamber 32 during product testing. In this arrangement, RF signals may be conveyed between transceiver circuitry 6 of DUT 10 and test unit 22.

During product testing, each test station 13 may experience run-to-run measurement variation due to variations in OTA path loss (e.g., path loss associated with the propagation of radio-frequency signals as they propagate through air, path loss associated with the behavior of each OTA antenna 20 during actual wireless transmission, etc.), RF cable path loss (e.g., path loss associated with each RF cable 24), and variations in each test unit 22 (e.g., process, voltage, and temperature variations that may affect the operation of each tester).

Path loss can be defined as the attenuation in power as wireless signals propagate through a particular medium. The OTA path loss and RF cable path loss in each test station 13 are typically unique, because it is challenging to manufacture test components (e.g., OTA antennas 20, RF cables 24, etc.) that are exactly identical to one another and to configure each test station 13 with an identical spatial arrangement. Path loss may be sensitive to the location of antenna 20, the placement of DUT 10 within the test chamber, the output power level of DUT 10, the operating frequency of DUT 10, etc.

Characterizing the OTA path loss of each test station 13 across desired frequencies can be an arduous and time-intensive procedure, because path loss has to be characterized across multiple test variables (e.g., the output power level of DUT 10, frequency of DUT 10, etc.). As a result, it may be more efficient to perform product testing without characterizing the OTA path loss of each test station 13.

A golden DUT (or golden reference DUT) may be placed into test chamber 32 prior to product testing (e.g., during calibration operations). A golden DUT is a carefully selected DUT that exhibits known performance levels. During a first time period, test host 26 may direct the golden DUT to produce RF signals at a first requested output power level. Test unit 22 may measure the actual output power level produced by the golden DUT during the first time period to obtain a first data point. During a second time period, test host 26 may direct the golden DUT to produce RF signals at a second requested output power level. Test unit 22 may measure the actual output power level produced by the golden DUT during the second time period to obtain a second data point.

A given line that passes through the first and second data points may be provided. The given line may be compared to an ideal characteristic line to generate a corrected linear equation (e.g., a linear function). The corrected linear equation may be used to compute an expected output power level for each requested output power level. Calibration procedures that generate reference linear equations have been developed to calibrate direct current (DC) power supply units.

During product testing, test host 26 may direct a factory DUT to produce RF signals at a desired output power level. Test unit 22 may measure the actual output power level produced by the factory DUT. An expected output power level may be computed based on the corrected linear equation (e.g., by providing the desired output power level as an input value to the corrected linear equation). The measured output power level that is obtained using test unit 22 and the expected output power level that is computed based on the corrected linear equation may be compared to determine whether the factory DUT satisfies pass/fail (design) criteria. Testing factory DUTs 10 to determine whether each DUT 10 satisfies design criteria in this way may be performed at desired frequencies.

For example, consider a scenario in which test unit 26 directs production DUT 10 to produce RF signals at a requested output power level of 18 dBm at a selected frequency. Power in terms of dBm expresses power relative to 1 mW in units of decibels. Test unit 22 may be used to measure a measured output power level of −24 dBm. Assuming that the test chamber has a nominal path loss value of −40 dB, the measured output power level can be adjusted to be equal to 16 dBm (−24 minus −40) to remove the effect of OTA path loss. This method assumes a nominal path loss value rather than actually measuring the OTA path loss.

An expected output power level of 17.3 dBm may be computed based on a corrected linear equation associated with the selected frequency (e.g., the expected output power level is computed for the requested output power level of 18 dBm). In this example, an error of 1.3 dBm (17.3−16) between the expected output power level and the measured output power level may be acceptable. As a result, DUT 10 may be marked as a passing (valid) DUT.

Consider another scenario in which test unit 26 directs production DUT 10 to produce RF signals at a requested output power level of 14 dBm at the selected frequency. Test unit 22 may be used to measure a measured output power level of −30.5 dBm. Assuming that the test chamber has a nominal path loss value of −40 dB, the measured output power level can be recomputed to be equal to 9.5 dBm (−30.5 minus −40) to remove the effect of OTA path loss.

An expected output power level of 12.9 dBm may be computed based on the corrected linear equation (e.g., by using 12.9 dBm as the input variable to the corrected linear equation that is associated with the selected frequency). In this example, an error of 3.4 dBm (12.9−9.5) between the expected output power level and the measured output power level may be unacceptable. As a result, DUT 10 may be marked as a failing (invalid) DUT.

Figure 3:
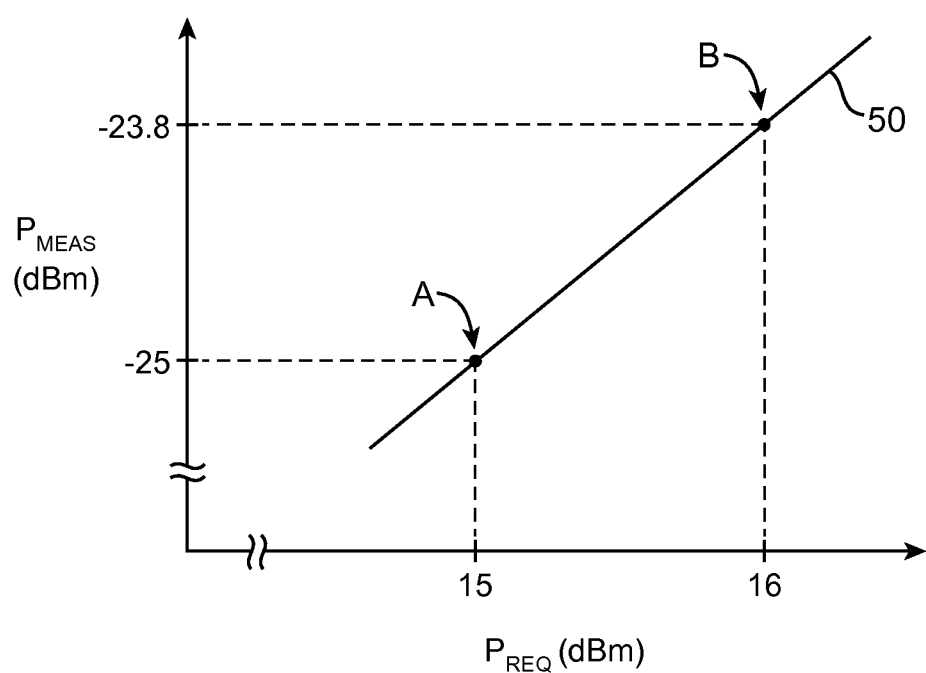
FIG. 3 is a graph illustrating how measured output power level may vary as a function of requested output power level in accordance with an embodiment of the present invention.

FIG. 3 shows a graph of measured output power $P_{MEAS}$ as a function of requested output power $P_{REQ}$. For example, during a first time period, test host 26 may configure a golden DUT to produce RF signals at a request output power level of 15 dBm. Test unit 22 may be used to obtain a corresponding measured output power level of −25 dBm (see, e.g., point A in FIG. 3) during the first time period. Similarly, test host 26 may configure the golden DUT to produce RF signals at a request output power level of 16 dBm during a second time period. Test unit 22 may be used to obtain a corresponding measured output power level of −23.8 dBm (see, e.g., point B in FIG. 3) during the second time period. A line such as line 50 may pass through points A and B.

Figure 4:
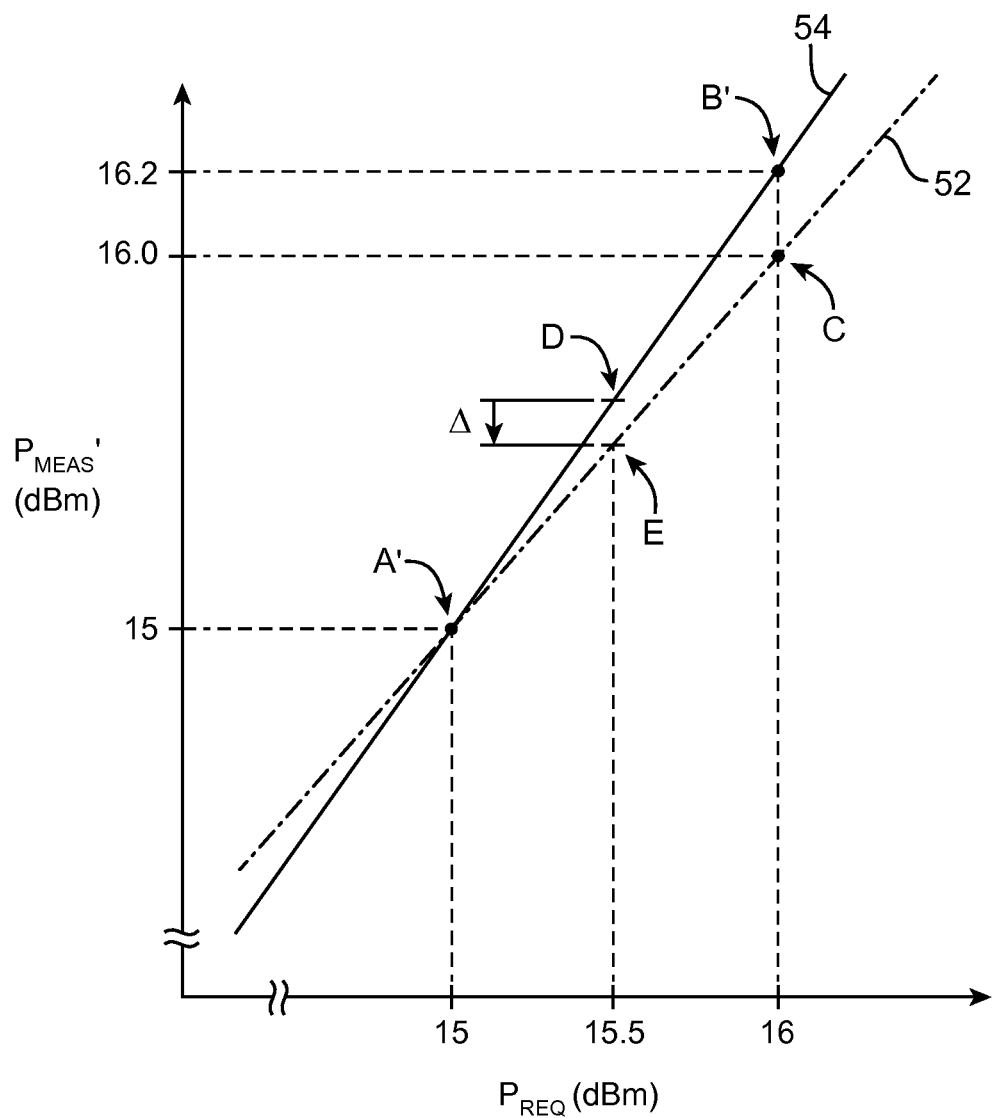
FIG. 4 is a graph illustrating a measured output power level characteristic line and an ideal output power level characteristic line as a function of requested output power level in accordance with an embodiment of the present invention.

The measured output power level $P_{MEAS}$ as shown in FIG. 3 may be adjusted (offset) by taking into account a nominal path loss value. For example, assume that the nominal path loss value for test station 13 that is being calibrated is equal to −40 dB. As shown in FIG. 4, points A and B may therefore have adjusted $P_{MEAS}'$ values of 15 dBm (−25+40) corresponding to point A' and 16.2 dBm (−23.8+40) corresponding to point B', respectively. Line 54 that passes through points A' and B' may have the same slope as line 50 of FIG. 3, because line 54 is a vertically shifted version of line 50 (e.g., line 54 is shifted up by the nominal path loss magnitude of 40 dB).

As shown in FIG. 4, an ideal characteristic line such as characteristic line 52 has a slope of 1.0. For example, a requested output power level of 15 dBm should ideally yield a measured output power level of 15 dBm (point A'), whereas a requested output power level of 16 dBm should ideally yield a measured output power level of 16 dBm (point C). Dotted line 52 may pass through points A' and C (see, e.g., FIG. 4)).

A corrected linear equation may be generated based on calibration line 54 (e.g., a line that is obtained using a golden DUT during calibration operations) and ideal characteristic line 52. A corrected linear equation may be computed based on the differences between lines 52 and 54.

For example, test host 26 may be used to compute the slope m of line 54 (e.g., by dividing the difference in the y-values of points A' and B' by the difference in the x-values of points A' and B'). If slope m of line 54 is not equal to one, a corrected slope $m_{CORR}$ may be computed by taking the reciprocal of m (e.g., corrected slope $m_{CORR}$ is equal to 1/m).

Test host 26 may be used to compute an offset Δ (e.g., a vertical distance) between lines 52 and 54. Offset value Δ may be computed at the midpoint of the x-coordinates of A' and B' (or C). Offset Δ may be defined as the vertical distance between the y-value of line 52 that corresponds to the x-coordinate of the midpoint and the y-value of line 54 that corresponds to the x-coordinate of the midpoint (e.g., the vertical distance between the midpoint of segment A'C and the midpoint of segment A'B'). If offset Δ is not equal to zero, a corrected offset $\Delta_{CORR}$ may be computed by taking the negated version of offset Δ (e.g., corrected offset $\Delta_{CORR}$ is equal to −Δ).

For example, consider the scenario that is shown in FIG. 4. Slope m of line 52 is equal to 1.2 ((16.2−15)/(16−15)). Corrected slope $m_{CORR}$ may therefore be equal to ⅚(1.2$^{-1}$). Offset Δ may be computed by taking the vertical distance between the midpoint of segment A'B' and the midpoint of segment A'C. The y-value of the midpoint of segment A'B' is equal to 15.6 ((15+16.2)/2), whereas the midpoint of segment A'C is equal to 15.5 ((15+16)/2) (as examples). In this scenario, offset Δ is equal to −0.1 (15.5 minus 15.6). Corrected offset $\Delta_{CORR}$ may therefore be equal to +0.1 (−(−0.1)).

The general form for the corrected linear equation is shown in equation 1.

$$P_{EXP} = m_{CORR} * P_{REQ} + \Delta_{CORR} \quad (1)$$

As shown in equation 1, the expected output power level $P_{EXP}$ is computed by adding corrected offset $\Delta_{CORR}$ to the product of corrected slope $m_{CORR}$ and requested output power level $P_{REQ}$. The corrected linear equation corresponding to the example of FIG. 4 can be shown in equation 2.

$$P_{EXP} = \tfrac{5}{6} * P_{REQ} + 0.1 \quad (2)$$

Consider a scenario in which test host 26 directs a factory DUT to produce RF signals at requested output power level $P_{REQ}$ of 15.2 dBm. Expected power level $P_{EXP}$ corresponding to a $P_{REQ}$ of 15.2 dBm may be computed to be equal to 12.77 dBm (⅚*15.2+0.1). The output power level measured using test unit 22 may be equal to 14.1 dBm. An error of 1.33 dB (14.1−12.77) may be tolerable according to design criteria. The factory DUT may therefore be marked as a passing DUT. Testing factory DUTs by interpolating expected output power levels in this way may be fast and accurate, because the pass/fail criteria are not dependent on measured OTA path loss values. Testing factory DUTs in this way may be performed at the desired frequencies.

As shown in FIG. 2, each test station 13 may be connected to computing equipment 36 through line 38. Computing equipment 36 may include storage equipment on which a database 40 is stored. The corrected linear equation associated with each desired frequency may be stored in database 40.

Figure 5:
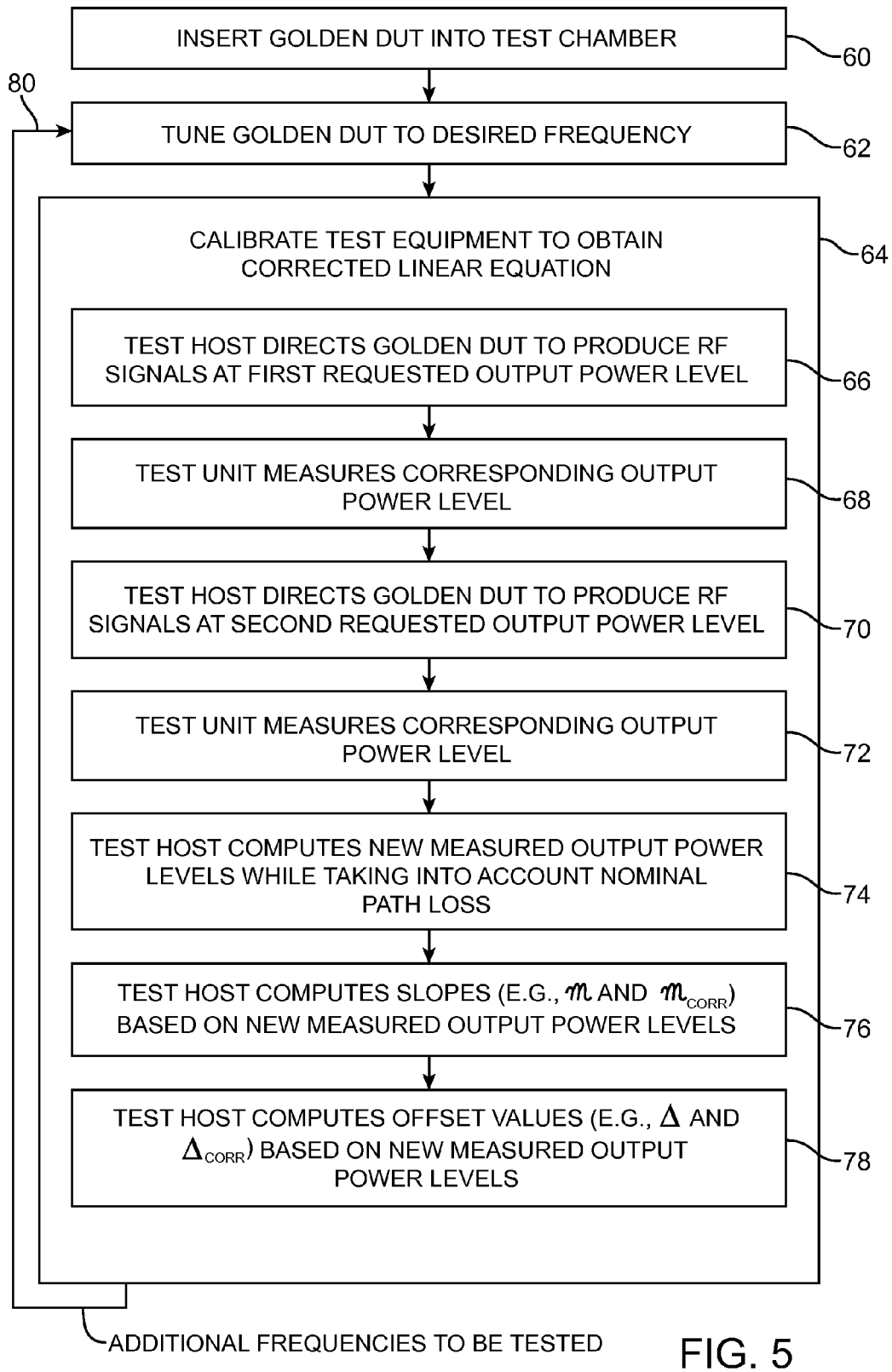
FIG. 5 is a flow chart of illustrative steps involved in computing a corrected linear equation in accordance with an embodiment of the present invention.

FIG. 5 shows steps involved in obtaining a corrected linear equation prior to product testing. At step 60, a golden DUT may be inserted into test chamber 32. At step 62, the golden DUT may be tuned to a desired frequency.

At step 64, the golden DUT may be used to calibrate the test equipment (e.g., test chamber 32, test unit 22, RF cabling 24, network equipment, etc.) to compute a corrected linear equation. At step 66, test host 26 may direct the golden DUT to produce RF signals at a first requested output power level. Test unit 22 may be used to measure the corresponding output power level while the golden DUT is producing RF signals at the first requested output power level to obtain a first data point (step 68). At step 70, test host 26 may direct the golden DUT to produce RF signals at a second requested output power level. Test unit 22 may be used to measure the corresponding output power level while the golden DUT is producing RF signals at the second requested output power level to obtain a second data point (step 72).

At step 74, test host 26 may compute new (adjusted) output power levels by taking into account a nominal path loss value (e.g., by shifting a line that passes through the first and second data points vertically upwards by the magnitude of the nominal path loss value). At step 76, test host 26 may be used to compute slopes m and $m_{CORR}$ based on the adjusted measured output power levels using the method described in connection with FIG. 4. At step 78, test host 26 may be used to compute offset values Δ and $\Delta_{CORR}$ using the method described in connection with FIG. 4. Processing may loop back to step 62 if there are additional frequencies to be tested (e.g., to compute the corrected linear equation at other desired frequencies), as indicated by path 80. If desired, more than one golden DUT may be used to calibrate test station 13 to ensure the accuracy of the corrected linear equation.

Figure 6:
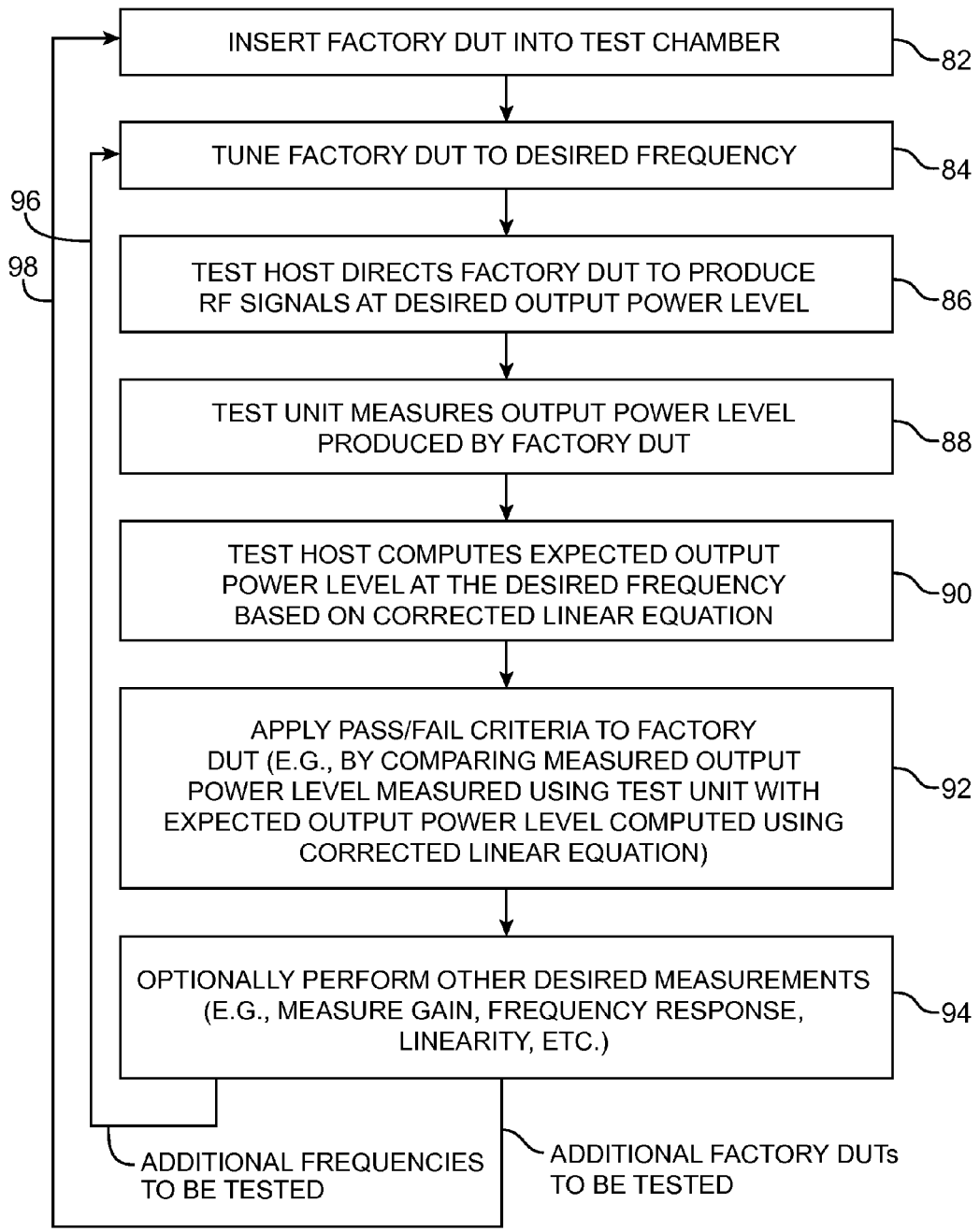
FIG. 6 is a flow chart of illustrative steps involved in testing wireless devices under test using the corrected linear equation of FIG. 5 in accordance with an embodiment of the present invention.

FIG. 6 shows steps involved in performing product testing on wireless DUTs 10. At step 82, factory DUT 10 may be placed into test chamber 32. At step 84, test host 26 may tune DUT 10 to a desired frequency. At step 86, test host 26 may configure DUT 10 to produce RF signals at a desired output power level. At step 88, test unit 22 may be used to measure the output power level of DUT 10 while DUT 10 is transmitting RF signals at the desired output power level.

At step 90, test host 26 may compute an expected output power level based on the corrected linear equation that is associated with the desired frequency (e.g., by taking the desired output power level as the input to the corrected linear equation). At step 92, pass/fail criteria may be applied to DUT 10 by comparing the measured output power level that is obtained using test unit 22 with the expected output power level computed using the corrected linear equation. If the error between the measured output power level and the expected output power level is less than a predetermined threshold error value, DUT 10 is marked as a passing (valid) DUT at the desired frequency. If the error between the measured output power level and the expected output power level is greater than the predetermined threshold error value, DUT 10 is marked as a failing (invalid) DUT at the desired frequency.

At step 94, test host 26 may be configured to perform other desired measurements on DUT 10 (e.g., to measure its gain, frequency response, linearity, etc.). Processing may loop back to step 84 if there are additional frequencies to be tested, as indicated by path 96. Processing may loop back to step 82 if there are additional factory DUTs 10 to be test, as indicated by path 98.

The foregoing is merely illustrative of the principles of this invention and various modifications can be made by those skilled in the art without departing from the scope and spirit of the invention.

What is claimed is:

1. A method of calibrating a wireless test station, wherein the wireless test station includes a test chamber having an antenna, a test unit, and a radio-frequency cable that connects the antenna to the test unit, the method comprising:
   with a test host, computing a linear function, wherein the linear function provides an expected output power value as its output by receiving a requested output power value as its input;
   with the test host, directing a reference device under test to produce radio-frequency signals at a first requested output power level during a first time period; and
   with the test host, directing the reference device under test to produce radio-frequency signals at a second requested output power level during a second time period.

2. The method defined in claim 1, further comprising:
   with the test unit, measuring a first measured output power level while the reference device under test is transmitting the radio-frequency signals at the first requested output power level during the first time period to obtain a first data point; and
   with the test unit, measuring a second measured output power level while the reference device under test is transmitting the radio-frequency signals at the second requested output power level during the second time period to obtain a second data point.

3. The method defined in claim 2, further comprising:
   adjusting the first and second data points based on a nominal path loss value to obtain first and second adjusted data points.

4. The method defined in claim 3, wherein a line passes through the first and second adjusted data points, the method further comprising:
   with the test host, computing a given slope of the line.

5. The method defined in claim 4, further comprising:
   with the test host, computing a corrected slope by calculating the reciprocal of the given slope, wherein the linear function has a slope that is equal to the corrected slope.

6. The method defined in claim 3, wherein a line passes through the first and second adjusted data points, the method further comprising:
   with the test host, computing a given offset between the line and an ideal characteristic line, wherein the ideal characteristic line has a slope that is equal to one.

7. The method defined in claim 6, further comprising:
   with the test host, computing a corrected offset by calculating a negative version of the given offset, wherein the linear function has an offset that is equal to the corrected offset.

8. The method defined in claim 6, wherein computing the given offset between the line that passes through the first and second adjusted data points and the ideal characteristic line comprises computing the given offset corresponding to a desired requested output power level, and wherein the desired requested output power level is equal to an average of the first requested output power level and the second requested output power level.

9. The method defined in claim 2, further comprising:
   calibrating the wireless test station with additional reference devices under test to ensure accuracy of the linear function.

10. A method of calibrating test equipment for testing devices under test, comprising:
    with the test equipment, configuring a reference device under test to produce signals at different requested output power levels;
    with the test equipment, measuring output power levels while the reference device under test is producing the signals at the different requested output power levels; and
    with the test equipment, computing a corrected linear equation based on the measured output power levels.

11. The method defined in claim 10, wherein computing the corrected linear equation takes into account a nominal path loss value.

12. The method defined in claim 10, wherein computing the corrected linear equation comprises computing a corrected slope and a corrected offset for the corrected linear equation.

13. The method defined in claim 10, further comprising:
    with the test equipment, adjusting the measured output power levels based on a nominal path loss value to obtain first and second adjusted data values.

14. The method defined in claim 13, wherein a line passes through the first and second adjusted data points, the method further comprising:
    with the test equipment, computing a given slope of the line.

15. The method defined in claim 14, further comprising:
    with the test equipment, computing a corrected slope by calculating the reciprocal of the given slope, wherein the corrected linear equation has a slope that is equal to the corrected slope.

16. The method defined in claim 14, further comprising:
    with the test equipment, computing a given offset between the line and another line with a slope of one.

17. The method defined in claim 16, further comprising:
    with the test equipment, computing a corrected offset for the corrected linear equation by calculating a negative version of the given offset.

18. The method defined in claim 17, wherein computing the given offset between the line that passes through the first and second adjusted data points and the another line comprises computing the given offset corresponding to a desired requested output power level, and wherein the desired requested output power level is equal to an average of the different requested output power levels.

19. The method defined in claim 10, further comprising:
  calibrating the test equipment with additional reference devices under test to ensure accuracy of the corrected linear equation.

* * * * *